(12) United States Patent
Liao et al.

(10) Patent No.: US 11,092,747 B2
(45) Date of Patent: Aug. 17, 2021

(54) WHISPERING GALLERY MODE RESONATOR AND MANUFACTURING METHOD THEREOF

(71) Applicant: Shenzhen University, Guangdong (CN)

(72) Inventors: Changrui Liao, Shenzhen (CN); Yiping Wang, Shenzhen (CN); Chupao Lin, Shenzhen (CN); Ying Wang, Shenzhen (CN); Jun He, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 557 days.

(21) Appl. No.: 16/076,585

(22) PCT Filed: Aug. 16, 2017

(86) PCT No.: PCT/CN2017/097639
§ 371 (c)(1),
(2) Date: Aug. 8, 2018

(87) PCT Pub. No.: WO2019/033293
PCT Pub. Date: Feb. 21, 2019

(65) Prior Publication Data
US 2021/0181422 A1 Jun. 17, 2021

(51) Int. Cl.
*G02B 6/293* (2006.01)
*G02B 6/255* (2006.01)

(52) U.S. Cl.
CPC ....... *G02B 6/29341* (2013.01); *G02B 6/2551* (2013.01)

(58) Field of Classification Search
None
See application file for complete search history.

(56) References Cited

U.S. PATENT DOCUMENTS

2010/0296103 A1 11/2010 Smith et al.
2014/0314375 A1* 10/2014 Xiao ................ G02B 6/29341
385/43

FOREIGN PATENT DOCUMENTS

CN 101910898 A 12/2010
CN 103033882 A 4/2013
(Continued)

OTHER PUBLICATIONS

International Search Report and Written Opinion dated May 2, 2018 for International Application No. PCT/CN2017/097639, filed Aug. 16, 2017.

*Primary Examiner* — Chad H Smith

(57) ABSTRACT

A whispering gallery mode resonator and a manufacturing method includes a hollow core fiber, a waveguide, a waveguide resonant cavity, a first single-mode fiber and a second single-mode fiber. The waveguide and the waveguide resonant cavity are located in the hollow core fiber. End surface of the first and second single-mode fibers are fused to end surfaces of the hollow core fiber. The waveguide includes an input optical waveguide, an inner surface waveguide having an evanescent field and an output optical waveguide. The two end surfaces of the input optical waveguide are connected with an end surface of the core of the first single-mode fiber and an end surface of the inner surface waveguide respectively. The two end surfaces of the output optical waveguide are connected with an end surface of the core of the second single-mode fiber and the other end surface of the inner surface waveguide respectively.

10 Claims, 4 Drawing Sheets

(56) References Cited

FOREIGN PATENT DOCUMENTS

| CN | 106840361 A | 6/2017 |
|---|---|---|
| CN | 107272116 A | 10/2017 |
| WO | 2007127512 A2 | 11/2007 |

\* cited by examiner

WHISPERING GALLERY MODE RESONATOR AND MANUFACTURING METHOD THEREOF

CROSS-REFERENCE TO RELATED APPLICATION

This Application is a Section 371 National Stage Application of International Application No. PCT/CN2017/097639, filed Aug. 16, 2017, the contents of which are hereby incorporated by reference in their entirety.

TECHNICAL FIELD

The present disclosure pertains to optical device field, particularly relates to a whispering gallery mode resonator and a manufacturing method thereof.

BACKGROUND

A whispering gallery mode resonator confines light in a resonant cavity by means of continuous total internal reflection at the boundary of a medium cavity and has an important application prospect in fields such as nonlinear optics, cavity quantum electrodynamics and ultra-high resolution detection.

In the prior art, there are mainly four methods for manufacturing whispering gallery mode resonators, namely prism coupling method, micro-nano fiber coupling method, fiber tip coupling method and planar waveguide coupling method. The whispering gallery mode resonators fabricated by prism coupling have complex structures which is not good for optical integration. The whispering gallery mode resonators fabricated by micro-nano fiber coupling are not stable in terms of structure. The whispering gallery mode resonators fabricated by fiber tip coupling have complex and unstable structures. And the whispering gallery mode resonators fabricated by planar waveguide coupling are not good for optical integration.

Therefore, there are problems such as complex structure, unstable structure and not being good for optical integration with the whispering gallery mode resonators fabricated by the prior art.

SUMMARY

A primary object of the present disclosure is to provide a whispering gallery mode resonator intended to address problems such as complex structure, unstable structure and not being good for optical integration with the whispering gallery mode resonators fabricated by prior art.

In order to realize the above-described object, the present disclosure provides a whispering gallery mode resonator. The whispering gallery mode resonator includes a hollow core fiber, a waveguide, a waveguide resonant cavity, a first single-mode fiber and a second single-mode fiber.

Said waveguide and said waveguide resonant cavity are located in said hollow core fiber.

An end surface of said first single-mode fiber is connected by fusion splicing with an end surface of said hollow core fiber, and an end surface of said second single-mode fiber is connected by fusion splicing with the other end surface of said hollow core fiber.

Said waveguide comprises an input optical waveguide, an inner surface waveguide and an output optical waveguide, two end surfaces of said input optical waveguide are connected with an end surface of a core of said first single-mode fiber and an end surface of said inner surface waveguide respectively, two end surfaces of said output optical waveguide are connected with an end surface of a core of said second single-mode fiber and the other end surface of said inner surface waveguide respectively.

Said inner surface waveguide has an evanescent field.

Further, said hollow core fiber is of pure quartz and provided with a hollow cavity therein.

Further, said hollow cavity is a rectangular cavity.

Further, said waveguide resonant cavity is a microsphere resonant cavity.

Further, said waveguide resonant cavity has a refractive index greater than 1.444.

Further, said waveguide resonant cavity is fixed to an inner wall of said rectangular hollow cavity by weak arcing annealing treatment.

Further, said input optical waveguide and said output optical waveguide are S-type waveguides written by femtosecond laser direct writing technology.

In order to realize the above-described object, the present disclosure further provides a method for manufacturing a whispering gallery mode resonator. Said method is for manufacturing the whispering gallery mode resonator of any one of claims 1-7 and comprises:

fusing said hollow core fiber to obtain a hollow core fiber device;

making by writing an input optical waveguide inside said hollow core fiber with femtosecond laser direct writing technology;

making by writing an inner surface waveguide with an evanescent field inside said hollow core fiber with said femtosecond laser direct writing technology, wherein one end surface of said inner surface waveguide is connected with an end surface of said input optical waveguide; and making by writing an output optical waveguide inside said hollow core fiber with said femtosecond laser direct writing technology, wherein one end surface of said output optical waveguide is connected with another end surface of said inner surface waveguide.

Further, said step of fusing said hollow core fiber to obtain a hollow core fiber device includes:

fusion splicing an end surface of the hollow core fiber with the first single-mode fiber, and cutting said first single-mode fiber at a preset length from the fusion point to obtain a hollow core fiber with a single-mode fiber fusion spliced at one end surface;

securing the waveguide resonant cavity in the hollow cavity of said hollow core fiber; and fusion splicing the other end surface of the hollow core fiber that has been fusion spliced with a single-mode fiber at one end surface and fixed with the waveguide resonant cavity with the second single-mode fiber, and cutting the second single-mode fiber at a preset length from the fusion point to obtain said hollow core fiber device with single-mode fibers fusion spliced at both end surfaces and fixed with said waveguide resonant cavity.

Further, said step of securing the waveguide resonant cavity in the hollow cavity of said hollow core fiber includes:

placing said waveguide resonant cavity into said hollow cavity of said hollow core fiber with a tapered fiber, a microscope and a micromanipulator;

in a fusion splicer, pushing said waveguide resonant cavity to the center position of said hollow core fiber with the tapered fiber; and applying weak arcing annealing treatment to said waveguide resonant cavity with said fusion splicer to fix said waveguide resonant cavity within the hollow cavity of said hollow core fiber.

The present disclosure provides a whispering gallery mode resonator. The whispering gallery mode resonator includes a hollow core fiber, a waveguide, a waveguide resonant cavity, a first single-mode fiber and a second single-mode fiber. The waveguide and the waveguide resonant cavity are located in the hollow core fiber. An end surface of the first single-mode fiber is connected with an end surface of the hollow core fiber by fusing. An end surface of the second single-mode fiber is connected with another end surface of the hollow core fiber by fusing. The waveguide includes an input optical waveguide, an inner surface waveguide and an output optical waveguide. The two end surfaces of the input optical waveguide are connected with an end surface of the core of the first single-mode fiber and an end surface of the inner surface waveguide respectively. The two end surfaces of the output optical waveguide are connected with an end surface of the core of the second single-mode fiber and the other end surface of the inner surface waveguide respectively. And the inner surface waveguide has an evanescent field. As compared to prior art, an end surface of each of the first single-mode fiber and the second single-mode fiber is connected with one of the two end surfaces of the hollow core fiber by fusing. The input optical waveguide is connected with an end surface of the core of the first single-mode fiber and an end surface of the inner surface waveguide respectively. The output optical waveguide is connected with an end surface of the core of the second single-mode fiber and another end surface of the inner surface waveguide respectively. The whispering gallery mode resonator fabricated by the above-described connection mode has a more stable and simpler structure. And implementing light coupling between the inner surface waveguide and the waveguide resonant cavity with the evanescent field of the inner surface waveguide is in favor of optical integration.

DESCRIPTION OF THE ENABLING EMBODIMENTS

In order to make objects, features and advantages of the present disclosure more apparent and easy to understand, the technical solution in embodiments of the present disclosure will be described below clearly and completely with reference to accompanying drawings in embodiments of the present disclosure. However, it is obvious that the described embodiments are merely partial embodiments rather than all embodiments of the present disclosure. All other embodiments obtained by one skilled in the art based on embodiments in the present disclosure without any creative work fall within the scope of the present disclosure.

In in order to explain the technical solution of the present disclosure, specific embodiments will be described below.

Figure 1:
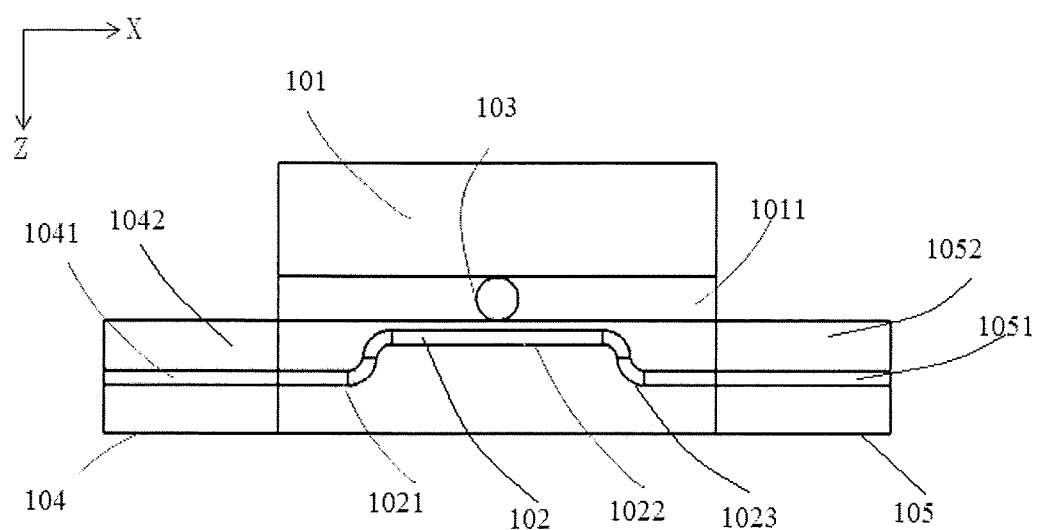
FIG. 1 is a top view of the structure of a whispering gallery mode resonator provided in the first embodiment of the present disclosure.
Figure 2:
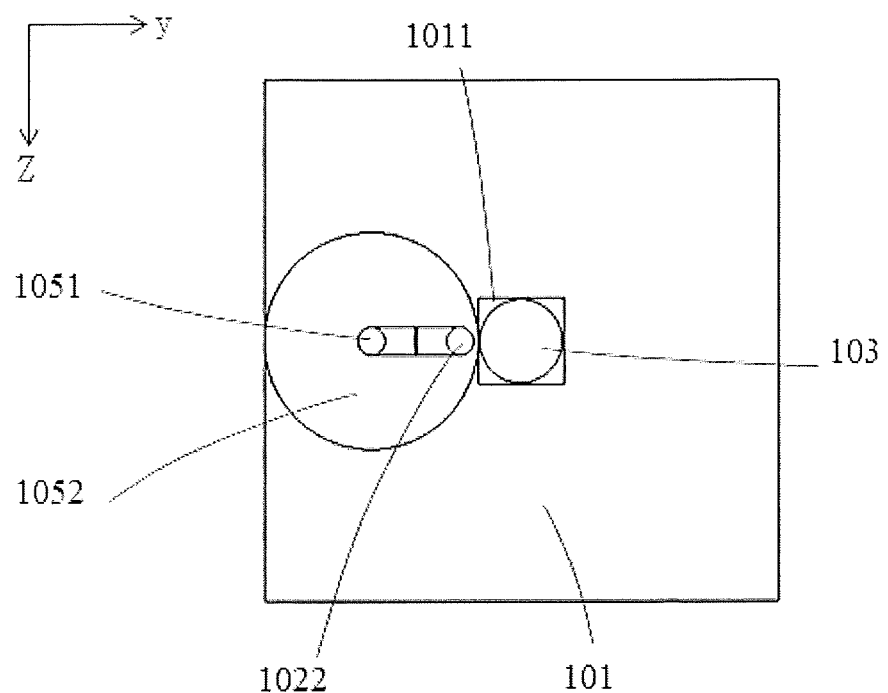
FIG. 2 is a side view of the structure of a whispering gallery mode resonator provided in the first embodiment of the present disclosure.

In order to better understand the present disclosure, please refer to the top view of the structure of a whispering gallery mode resonator shown in FIG. 1 and the side view of the structure of the whispering gallery mode resonator shown in FIG. 2. The whispering gallery mode resonator includes: a hollow core fiber 101, a waveguide 102, a waveguide resonant cavity 103, a first single-mode fiber 104 and a second single-mode fiber 105.

The waveguide 102 and the waveguide resonant cavity 103 are located in the hollow core fiber 101.

An end surface of the first single-mode fiber 104 is connected by fusion splicing with an end surface of the hollow core fiber 101, and an end surface of the second single-mode fiber 105 is connected by fusion splicing with the other end surface of the hollow core fiber 101.

The waveguide 102 includes an input optical waveguide 1021, an inner surface waveguide 1022 and an output optical waveguide 1023. The two end surfaces of the input optical waveguide 1021 are connected with an end surface of the core 1041 of the first single-mode fiber 104 and an end surface of the inner surface waveguide 1022 respectively. The two end surfaces of the output optical waveguide 1023 are connected with an end surface of the core 1051 of the second single-mode fiber 105 and the other end surface of the inner surface waveguide 1022 respectively.

The inner surface waveguide 1022 has an evanescent field.

In an embodiment of the present disclosure, the first single-mode fiber 104 consists of a core 1041 and a cladding 1042; the second single-mode fiber 105 consists of a core 1051 and a cladding 1052; and the hollow core fiber 101 is of pure quartz with a hollow cavity 1011 provided therein. The hollow core fiber 101 has no core and cladding and light cannot transmit through pure quartz.

Further, the hollow cavity 1011 is a rectangular cavity.

In an embodiment of the present disclosure, the waveguide resonant cavity 103 represents a cavity that can store light energy.

Further, the waveguide resonant cavity 103 is a microsphere resonant cavity with a refractive index greater than 1.444 wherein the size of the microsphere resonant cavity matches the size of the rectangular hollow cavity such that it may be exactly fit in the rectangular hollow cavity and fixed to the inner wall of the rectangular hollow cavity by arcing annealing treatment.

As can be seen in FIG. 2, the center points of the core 1041 of the first single-mode fiber 104 and the core 1051 of the second single-mode fiber 105 are at the same height in YZ plane as the center point of the hollow core fiber 101.

The YZ plane is the plane formed by Y axis and Z axis in a 3D image.

Further, the input optical waveguide 1021 and the output optical waveguide 1023 are S-type waveguide fabricated by femtosecond laser direct writing technology. The inner surface waveguide 1022 is also fabricated by femtosecond laser direct writing technology and is of straight line type. The inner surface waveguide 1022 has no contact with the inner surface of the rectangular hollow cavity with pure quartz separating therebetween.

In an embodiment of the present disclosure, the waveguide 102 and the pure quartz constitute the core and cladding structure. Light in the first single-mode fiber 104 is coupled into the inner surface waveguide 1022 with the input optical waveguide 1021. Coupling between the inner surface waveguide 1022 and the waveguide resonant cavity 103 is realized with the evanescent field of the inner surface waveguide 1022 to couple light from the inner surface waveguide 1022 into the waveguide resonant cavity 103. The light travels several rounds in the waveguide resonant cavity 103, partial light remains in the waveguide resonant cavity 103 and the remaining light would return the inner surface waveguide. Then light that returns the inner surface waveguide 1023 is coupled into the second single-mode fiber 105 with the output optical waveguide 1023.

In an embodiment of the present disclosure, the whispering gallery mode resonator includes a hollow core fiber 101, a waveguide 102, a waveguide resonant cavity 103, a first single-mode fiber 104 and a second single-mode fiber 105. The waveguide 102 and the waveguide resonant cavity 103 are located in the hollow core fiber 101. An end surface of the first single-mode fiber 104 is connected with an end surface of the hollow core fiber 101 by fusing. An end surface of the second single-mode fiber 105 is connected with another end surface of the hollow core fiber 101 by fusing. The waveguide 102 includes an input optical waveguide 1021, an inner surface waveguide 1022 and an output optical waveguide 1023. The two end surfaces of the input optical waveguide 1021 are connected with an end surface of the core 1041 of the first single-mode fiber 104 and an end surface of the inner surface waveguide 1022 respectively. The two end surfaces of the output optical waveguide 1023 are connected with an end surface of the core 1051 of the second single-mode fiber 105 and the other end surface of the inner surface waveguide 1022 respectively. And the inner surface waveguide 1022 has an evanescent field. As compared to prior art, an end surface of each of the first single-mode fiber 104 and the second single-mode fiber 105 is connected with one of the two end surfaces of the hollow core fiber 101 by fusing. The input optical waveguide 1021 are connected with an end surface of the core 1041 of the first single-mode fiber 104 and an end surface of the inner surface waveguide 1022 respectively. The output optical waveguide 1023 are connected with an end surface of the core 1051 of the second single-mode fiber 105 and another end surface of the inner surface waveguide 1022 respectively. The whispering gallery mode resonator fabricated by the above-described connection mode has a more stable and simpler structure. And implementing light coupling between the inner surface waveguide 1022 and the waveguide resonant cavity 103 with the evanescent field of the inner surface waveguide 1022 is in favor of optical integration.

Figure 3:
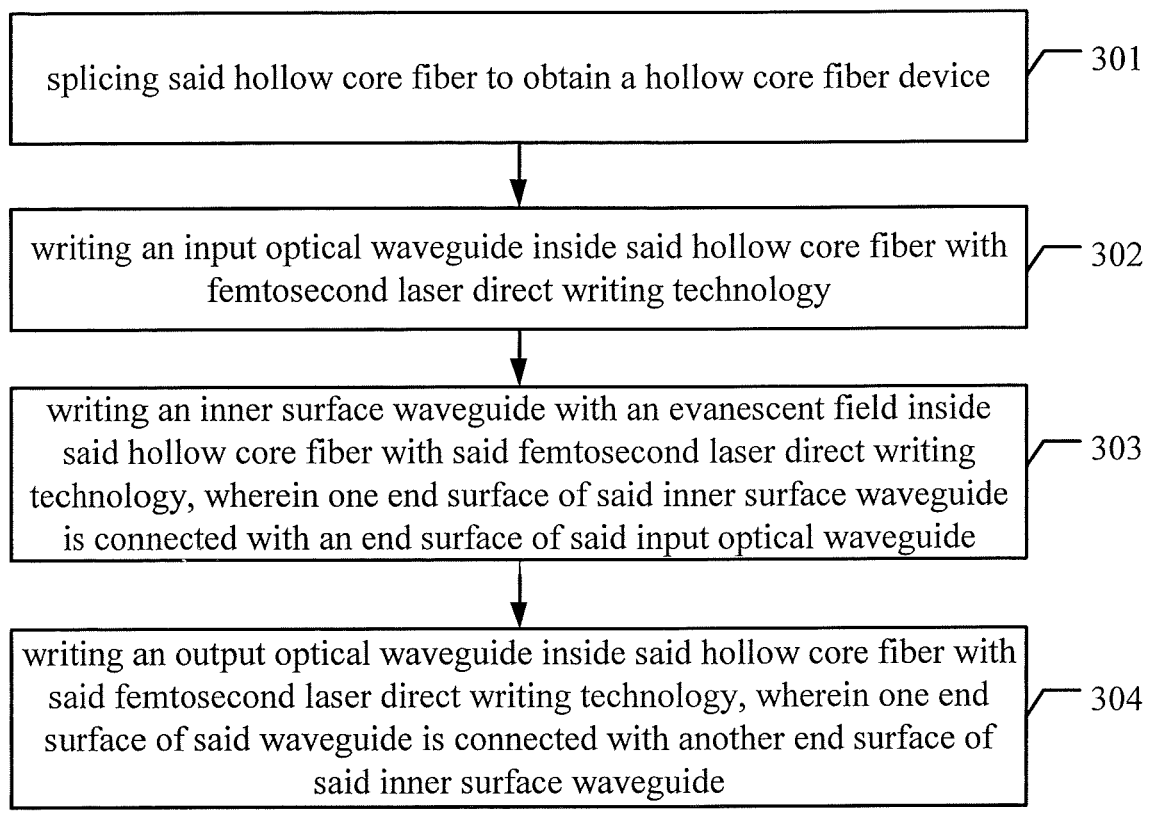
FIG. 3 is a flow chart of a method for manufacturing a whispering gallery mode resonator provided in the second embodiment of the present disclosure.

Referring to FIG. 3, which is a flow chart of a method for manufacturing a whispering gallery mode resonator provided in the second embodiment of the present disclosure and including the following steps.

In step S301, the hollow core fiber 101 is fused to obtain the hollow core fiber device.

Figure 4:
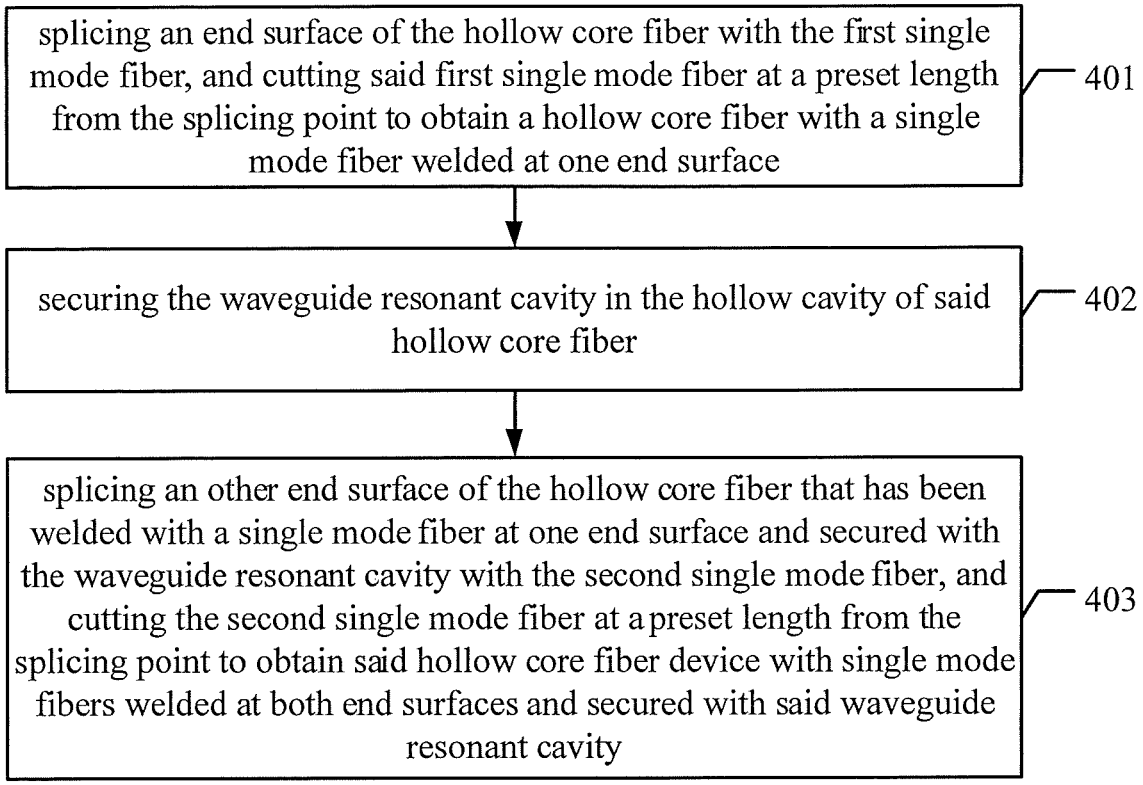
FIG. 4 is a flow chart of sub-steps of step S301 in the embodiment shown in FIG. 3.

Further, with reference to FIG. 4, which is a flow chart of sub-steps of step S301 in the second embodiment of the present disclosure, including the following steps.

In step S401, an end surface of the hollow core fiber 101 is fusion spliced with the first single-mode fiber 104, and the first single-mode fiber 104 is cut at a preset length from the fusion point to obtain a hollow core fiber 101 with a single-mode fiber fusion spliced at one end surface;

wherein, the preset length may be set to 100 μm, 200 μm, 300 μm, 1 cm, 2 cm etc, as desired.

In step S402, the waveguide resonant cavity 103 is fixed within the hollow cavity 1011 of the hollow core fiber 101.

In an embodiment of the present disclosure, the waveguide resonant cavity 103 is placed into the hollow cavity 1011 of the hollow core fiber 101 with a tapered fiber, a microscope and a micromanipulator. In the fusion splicer, the waveguide resonant cavity 103 is pushed to the center position of the hollow core fiber 101 with the tapered fiber and the waveguide resonant cavity 103 is subject to weak arcing annealing treatment with the fusion splicer such that the waveguide resonant cavity 103 is fixed in the hollow cavity 1011 of the hollow core fiber 101.

In step S403, the other end surface of the hollow core fiber 101 that has been fusion spliced with a single-mode fiber at one end surface and fixed with the waveguide resonant cavity 103 is fusion spliced with the second single-mode fiber 105, and the second single-mode fiber 105 is cut at a preset length from the fusion point to obtain a hollow core fiber 101 with single-mode fibers fusion spliced at both end surfaces and fixed with the waveguide resonant cavity 103.

In step S302, an input optical waveguide 1021 is written inside the hollow core fiber with femtosecond laser direct writing.

In step S303, an inner surface waveguide 1022 with evanescent field is written inside the hollow core fiber with femtosecond laser direct writing, wherein one end surface of the inside surface waveguide 1022 is connected with an end surface of the input optical waveguide 1021.

In step S304, an output optical waveguide 1023 is written inside the hollow core fiber with femtosecond laser direct writing, wherein one end surface of the waveguide 1023 is connected with another end surface of the inner surface waveguide 1022.

In embodiments of the present disclosure, the hollow core fiber 101 is fused to obtain the hollow core fiber device, the input optical waveguide 1021 is written inside the hollow core fiber device with femtosecond laser direct writing technology, the inner surface waveguide 1022 with an evanescent field is written inside the hollow core fiber device with femtosecond laser direct writing technology in which one end surface of the inner surface waveguide 1022 is connected with an end surface of the input optical waveguide 1021, and the output optical waveguide 1023 is written inside the hollow core fiber device with femtosecond laser direct writing technology in which an end surface of the output optical waveguide 1023 is connected with another end surface of the inner surface waveguide 1022. As compared to prior art, the input optical waveguide 1021, the inner surface waveguide 1022 and the output optical waveguide 1023 are written inside the hollow core fiber device with femtosecond laser direct writing technology, and the two end surfaces of the inner surface waveguide 1022 are connected with end surfaces of the input optical waveguide 1021 and the second S-type waveguide respectively. The whispering gallery mode resonator fabricated by the above-described connection mode has a more stable and simpler structure. And implementing light coupling between the inner surface waveguide 1022 and the waveguide resonant cavity 103 with the evanescent field of the inner surface waveguide 1022 is in favor of optical integration.

In the embodiments provided in the present application, it should be understood that the disclosed device and method may be implemented in other ways.

It is to be noted that for the method embodiments described above, they are all described as combinations of a series of acts for ease of description. However, one skilled in the art should appreciate that the present disclosure is not limited to the described order of acts since some steps may be carried out in other orders or simultaneously according to the present disclosure. Next, one skilled in the art should also appreciate that embodiments described in the specification are all preferred embodiments and acts and modules involved therein are not necessarily essential for the present disclosure.

In the above embodiments, embodiments have been described in respective emphasis, and for some parts of a certain embodiment that has not be described in detail, relevant description of other embodiments may be referred to.

What have been described above are a whispering gallery mode resonator and a manufacturing method thereof provided according to the present invention. Modifications to the detail embodiments and the scope of the application may occur to those skilled in the art according to the teachings of embodiments of the present invention. In summary, the content of the Description should not be construed as limiting the present invention.

The invention claimed is:

1. A whispering gallery mode resonator, wherein said whispering gallery mode resonator comprises a hollow core fiber, a waveguide, a waveguide resonant cavity, a first single-mode fiber and a second single-mode fiber;
said waveguide and said waveguide resonant cavity are arranged within said hollow core fiber;
an end surface of said first single-mode fiber is connected by fusion splicing with an end surface of said hollow core fiber, and an end surface of said second single-mode fiber is connected by fusion splicing with an other end surface of said hollow core fiber;
said waveguide comprises an input optical waveguide, an inner surface waveguide and an output optical waveguide, two end surfaces of said input optical waveguide are connected with an end surface of a core of said first single-mode fiber and an end surface of said inner surface waveguide respectively, two end surfaces of said output optical waveguide are connected with an end surface of a core of said second single-mode fiber and an other end surface of said inner surface waveguide respectively; and
said inner surface waveguide has an evanescent field.

2. The whispering gallery mode resonator of claim 1, wherein said hollow core fiber is of pure quartz and is provided with a hollow cavity therein.

3. The whispering gallery mode resonator of claim 2, wherein said hollow cavity is a rectangular hollow cavity.

4. The whispering gallery mode resonator of claim 1, wherein said waveguide resonant cavity is a microsphere resonant cavity.

5. The whispering gallery mode resonator of claim 1, wherein said waveguide resonant cavity has a refractive index greater than 1.444.

6. The whispering gallery mode resonator of claim 1, wherein said waveguide resonant cavity is fixed to an inner wall of a rectangular hollow cavity by weak arcing annealing treatment.

7. The whispering gallery mode resonator of claim 1, wherein said input optical waveguide and said output optical waveguide are S-type waveguides written by femtosecond laser direct writing technology.

8. A method for manufacturing a whispering gallery mode resonator of claim 1, comprising:
fusing said hollow core fiber to obtain a hollow core fiber device;
making by writing an input optical waveguide inside said hollow core fiber with femtosecond laser direct writing technology;
making by writing an inner surface waveguide with an evanescent field inside said hollow core fiber with said femtosecond laser direct writing technology, wherein one end surface of said inner surface waveguide is connected with one end surface of said input optical waveguide; and
making by writing an output optical waveguide inside said hollow core fiber with said femtosecond laser direct writing technology, wherein one end surface of said output optical waveguide is connected with the other end surface of said inner surface waveguide.

9. The method of claim 8, wherein the step of fusing said hollow core fiber to obtain a hollow core fiber device comprises:
fusion splicing an end surface of the hollow core fiber with the first single-mode fiber, and cutting said first single-mode fiber at a preset length from the fusion point to obtain a hollow core fiber with a single-mode fiber fusion spliced at one end surface thereof;
securing the waveguide resonant cavity within the hollow cavity of said hollow core fiber; and
fusion splicing the other end surface of the hollow core fiber that has been fusion spliced with a single-mode fiber at one end surface thereof and fixed with the waveguide resonant cavity with the second single-mode fiber, and cutting the second single-mode fiber at a preset length from the fusion point to obtain said hollow core fiber device with single-mode fibers fusion spliced at both end surfaces and fixed with said waveguide resonant cavity.

10. The method of claim 9, wherein said step of securing the waveguide resonant cavity within the hollow cavity of said hollow core fiber comprises:
placing said waveguide resonant cavity into said hollow cavity of said hollow core fiber with a tapered fiber, a microscope and a micromanipulator;
in a fusion splicer, pushing said waveguide resonant cavity to the center of said hollow core fiber with the tapered fiber; and
applying weak arcing annealing treatment to said waveguide resonant cavity with said fusion splicer to fix said waveguide resonant cavity within the hollow cavity of said hollow core fiber.

* * * * *